United States Patent [19]

Kastner et al.

[11] 3,827,031

[45] July 30, 1974

[54] ELEMENT SELECT/REPLACE APPARATUS FOR A VECTOR COMPUTING SYSTEM

[75] Inventors: William D. Kastner, Austin, Tex.; Gary W. Cobb, East Windsor, N.J.

[73] Assignee: Instruments Incorporated, Dallas, Tex.

[22] Filed: Mar. 19, 1973

[21] Appl. No.: 342,666

[52] U.S. Cl. .............................................. 340/172.5
[51] Int. Cl. ......... G06f 7/06, G06f 7/10, G06f 7/22
[58] Field of Search .................................. 340/172.5

[56] References Cited

UNITED STATES PATENTS

| | | | |
|---|---|---|---|
| 3,541,516 | 11/1970 | Senzig | 340/172.5 |
| 3,560,934 | 2/1971 | Ernst et al. | 340/172.5 |
| 3,568,156 | 3/1971 | Thompson | 340/172.5 |
| 3,573,851 | 4/1971 | Driscoll et al. | 340/172.5 |
| 3,593,300 | 7/1971 | Watson et al. | 340/172.5 |
| 3,603,937 | 9/1971 | Loizides et al. | 340/172.5 |
| 3,654,615 | 4/1972 | Freitag | 340/172.5 |

*Primary Examiner*—Paul J. Henon
*Assistant Examiner*—Jan E. Rhoads
*Attorney, Agent, or Firm*—Harold Levine; Rene' Grossman; Stephen S. Sadacca

[57] ABSTRACT

An apparatus is disclosed for processing vector data streams in such a way that, in a first mode, the data elements of a first vector stream are selected according to indices of those elements specified by a second vector stream. The selected elements are output in a single output vector stream. In a second mode the apparatus replaces elements in a third vector stream by elements in a first vector stream as specified by the indices in a second vector stream.

18 Claims, 1 Drawing Figure

ELEMENT SELECT/REPLACE APPARATUS FOR A VECTOR COMPUTING SYSTEM

Figure 1:
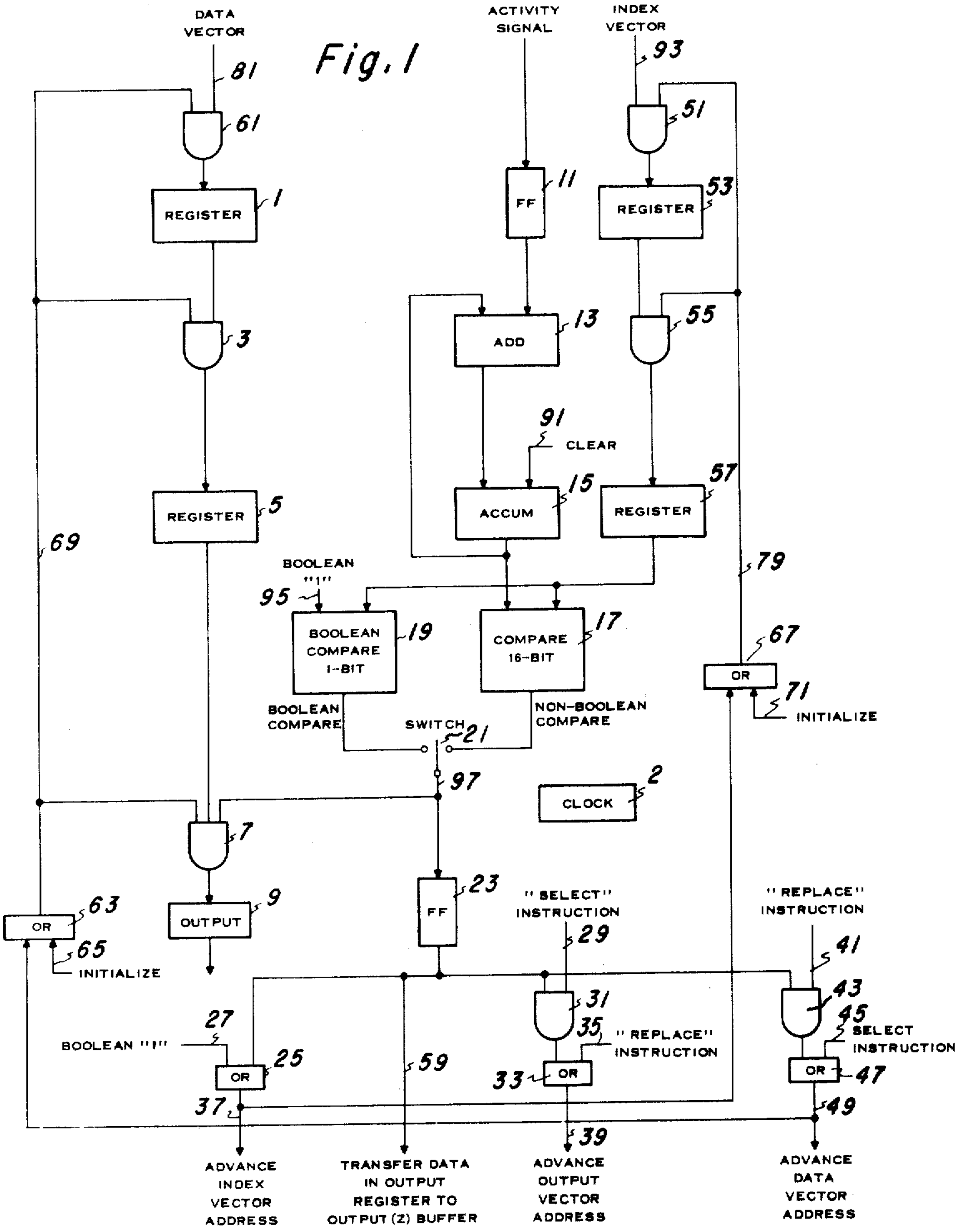

This invention relates to electronic digital computers, and more specifically, to apparatus for selecting and replacing specified elements of a vector stream of data in a vector computer.

A vector X is the array of elements $(x_1, x_2, x_3, \ldots, x_{\nu(x)})$. The element $x_i$ is the $i^{th}$ component of the vector X; and the number of components, denoted by $\nu(x)$ (or simply $\nu$ when the determining vector is clear from context), is called the dimension of $x$. A numerical vector X may be multiplied by a numerical quantity $k$ to produce the sealer times vector multiply $k \times X$ (or $kX$) defined as the vector Z such that $z_i = k \times X_i$.

All elementary operations defined on individual variable are extended consistently to vectors as component-by-component operations. For example, $Z = X + Y \longleftrightarrow z_i = x_i + y_i,$
$Z = X \times Y \longleftrightarrow z_i = x_i \times y_i,$
$Z = X \div \longleftrightarrow z_i = x_i \div y_i,$
$Z = |X| \longleftrightarrow z_i = |x_i|,$
$W = U \Lambda \Lambda V \longleftrightarrow w_i = u_i \Lambda v_i,$
$W = (X < Y) \longleftrightarrow w_i = (x_i < y_i).$ Thus, if $X = (1, 0, 1, 1)$ and $y = (0, 1, 1, 0)$, then $X + Y = (1, 1, 2, 1)$, $X \Lambda Y = (0, 0, 1, 0)$, and $(X < Y) = (0, 1, 0, 0)$. A matrix M is then ordered, two-dimensional array of variables $M_1^1, M_2^1, \ldots, M_{\nu(M)}^1$
$M_1^2, M_2^2, \ldots, M_{\nu(M)}^2$
$M_1^{\mu(M)}, \ldots, M_{\nu(M)}^{\mu(M)}$ The vector $(M_1^i, M_2^i, \ldots, M_{\nu(M)}^i)$ is called the $i^{th}$ row vector of M and is denoted by $M^i$. Its dimension $\nu(M)$ is called the row dimension of the matrix. The vector $(M_j^1, M_j^2, \ldots, M_j^{\mu(M)})$ is called the $j^{th}$ volumn vector of M and is denoted by $M_j$. Its dimension $\mu(M)$ is called the column dimension of the matrix.

The variable $M_j^i$ is called the $(i, j)^{th}$ component or element of the matrix. Operations defined on each element of a matrix are generalized component by component to the entire matrix. Thus, if 0 is any binary operator, $$P = M\ O\ N \longleftrightarrow P_j^i = M_j^i\ O\ N_j^i.$$

The invention herein is an apparatus capable of selecting elements in a first input vector as specified by index values contained in a second input vector. The index values specified in the second vector must be arranged in increasing order. Thus, if it is known the elements 1, 7, 5, and 9 are to be selected, the indices must be specified in the following way: 1, 5, 7, 9. In the specific embodiment shown, an index value of zero specifies the first element of a vector, an index value of one specifies the second element of a vector, etc.

When the apparatus disclosed herein is designated to operate in the "Select" mode, which may occur by the execution of a "Select" instruction in the central processor of a vector computer, only those elements of the first input vector whose indices are specified by the index values in the second input vector are selected and made available for inclusion in a single output vector.

For an example of the function of the apparatus disclosed herein while operating in the "Select" mode, the A, B, and C vectors are shown below where A is the input data vector, B is the index vector, and C is a vector containing the selected elements.

$A = a_0, a_1, a_2, \ldots, a_n$
$B = 3, 5, 6, 8$
$C = a_3, a_5, a_6, a_8$

The apparatus may also operate in a "Boolean" mode. In the Boolean mode only the single least significant bit of the index vector is tested to see if it is a one or a zero. Thus, a logic "1" compared with the least significant bit of an even 16-bit number will result in a false comparison while compared with the least significant bit of an odd 16-bit number will result in a true comparison. An example of a "Boolean Select" in which both input vectors A and B must be of equal length is shown below:

$A = a_1, a_2, a_3, a_4, a_5$
$B = 0, 1, 1, 0, 1$
(or
$B = 22, 41, 43, 2, 9$)
$C = a_2, a_3, a_5$

The apparatus disclosed herein is also capable of outputting elements of a first input data vector as specified by the indices in a second input data vector for inclusion into a third vector of elements which exists in memory. This function may in a typical computing system be initiated by the execution of a "Replace" instruction.

When executing a "Replace" instruction, the apparatus disclosed herein is able to output elements from a first input vector as specified by element indices in a second input vector wherein the output elements replace previously existing elements in a third vector located in memory. In the non-Boolean mode the first and second input vectors must be of equal length, and the third vector may be of any length. As an example of a vector replace instruction where A is the first (replacement) input vector, B is the second (index) vector, and C is the vector in memory, the resultant C vector is shown for the specified A and B vectors.

$A = a_0, a_1, a_2, a_3$
$B = 3, 5, 6, 8$
$C = c_0, c_1, c_2, a_0, c_4, a_1, a_2, c_7, a_3, c_9, c_{10}, \ldots, c_n.$ For a "Boolean Replace" instruction, the following example is given:

$A = a_1, a_2, a_3, a_4, a_5$
$B = 0, 1, 0, 1, 1$
(or
$B = 2, 3, 4, 3, 1$)
$C = c_1, a_2, c_3, a_4, a_5$

The apparatus disclosed herein receives signals to specify whether to operate in the "Select" instruction mode, "Replace" instruction mode, "Boolean Select" instruction mode, or "Boolean Replace" instruction mode.

In the "Select" instruction mode, a digital ramp index generator computes the index value of the corresponding elements of the first input vector as the first vector elements are transferred to the apparatus described herein. The output of the digital ramp index generator is compared with the index value of the elements in the second input vector. When the compared values are equal, a signal is generated which allows the output of the element of the first input vector corresponding to the index value compared. In the "Select" instruction mode, the elements of the first vector are input into the apparatus at the rate of one per clock time. However, after the first two elements of the second input vector is input into the apparatus described herein, additional elements of the second input vector are clocked through the apparatus only when a true compare occurs in the compare circuitry.

In the "Replace" instruction mode, the apparatus disclosed operates in a fashion similar to that of the "Select" mode. However, in the "Replace" mode, elements of the second input vector are accepted by the apparatus one element per clock time, while an element of the first input vector is accepted only after each true comparison in the compare logic. For initialization purposes, the first two elements of each vector are accepted by the apparatus and stored in registers.

A vector addressing apparatus which may be used in conjunction with the vector processing invention herein is described in copending U.S. Pat. application Ser. No. 177,564, now abandoned, by Carroll Ray Hall whose assignee is Texas Instruments Incorporated.

It is therefore an object of the invention to provide a new and improved apparatus for processing vector streams.

It is a further object of this invention to provide a new and improved apparatus for selecting specified elements from a vector of elements.

For a more complete understanding of the invention and for further objects and advantages thereof, reference may now be had to the following description taken in conjunction with the accompanying drawing in which the FIGURE shows the apparatus for selection of specified elements of a vector stream.

Referring now to the FIGURE, elements of the first input vector containing data for possible selection are received by the apparatus in register 1 through AND gate 61 from line 81. From register 1, data in the first vector is transferred through AND gate 3 to register 5, and from there through AND gate 7 to output register 9.

The transfer of data elements into register 1 and register 5 through AND gates 61 and 3 is controlled by the signal on line 69. To initialize the logic with data for normal operation, a logical "1" is applied to line 65 and, therefore, to line 69 through OR gate 63 for two clock times to allow the first two elements of the data input vector to be stored in register 5 and register 1, respectively. After the first two clock times, the initialized signal 65 is changed to a logic "0" such that the logic status of line 69 is controlled by the logic state on line 49. A system clock 2 is provided to control all gating.

An activity signal is applied to flip flop 11 when a "Select" or "Replace" instruction is initiated. The output of flip flop 11 is applied as one of two inputs to adder logic 13. The second element input to adder logic 13 is the previous value of the accumulator register 15. The adder output is then stored in accumulator register 15. This logic has the effect of incrementing the accumulator register 15 by one, one each clock time. A signal is applied to accumulator 15 via line 91 to clear the accumulator to zero immediately before a "Select" or "Replace" operation is initiated. In the "Select" mode, the accumulator register 15 contains the index address of the input data vector element in register 5. In the "Replace" mode, accumulator register 15 contains the index address of the output vector.

The second vector of elements (index vector) is received by the apparatus shown in FIG. 1 on line 93. The elements are gated through AND gate 51 to register 51, and then by AND gate 55 to register 57. Both AND gates 51 and 55 are controlled by the logic state on line 79.

Line 79 is set to logic state "1" by a "1" on line 71 during the first two clock times of a "Select" or "Replace" operation. This allows the first two elements of the index vector to be stored in register 57 and register 53, respectively. After the first two elements of the index vector are received, the initialize signal on line 71 becomes "0" such that the gating control on line 79 is controlled by the logic state on line 37 through OR gate 67.

The apparatus shown in FIG. 1 can operate either in a "Boolean" or "normal" mode.

In the "Boolean" mode a logic "1" is applied to line 95 which is an input to Boolean compare logic 19, a logic "1" is applied to line 27 which is an input to OR gate 25, and switch 21 connects the output of Boolean compare logic 19 to line 97. When in the normal mode of operation, switch 21 connects output of non-Boolean compare unit 17 with line 97. The Boolean compare unit 19 is a one-bit compare between a logic "1" and the elements of the index vector, while the non-Boolean compare 17 is a 16-bit compare between the values in accumulator 15 and register 57.

The compare output, controlled by switch 21, is input via line 97 to AND gate 7 and flip flop 23. Flip flop 23, whose output indicates if the previous comparison in units 17 or 19 was true or false, provides an input to OR gate 25, AND gate 31, and AND gate 43.

The second input 27 to OR gate 25 is a "1" if the select or replace function being performed in Boolean; else zero. The output of OR gate 25 on line 37 controls the movement of the index vector elements via AND gates 51 and 55. When line 37 is a "1," the element from register 53 is transferred to register 57, and simultaneously a new element is gated into register 53. Line 37 is also made available to external addressing circuitry to indicate that the index vector should be increased by one (advanced).

In the "Select" instruction mode, a "1" is input on lines 29 and 45 and a "0" is input on lines 101 and 41. In the "Replace" mode, the logic states on these four lines are reversed.

The output of OR gate 33 is made available via line 39 to external addressing circuitry to indicate that the output vector address should be advanced.

The output of OR gate 47 is input to OR gate 63 via line 49 which controls the transfer of data via line 69 through the data vector registers. When line 69 is a logic "1," data in register 1 is gated into register 5 and a new data element is gated into register 1. Line 49 is also made available to external addressing circuitry to indicate that the data vector address should be advanced.

An example of a select operation utilizing the apparatus of this invention is given in Table I where the second vector stream contains the index values 1, 5, 7, 9. As previously stated, a single clock 2 is utilized to operate all registers of the system simultaneously. As can be seen from Table I, synchronization is provided entirely by the internal logic gates. As stated above, the only external inputs to the apparatus provided by the computer are as follows: an activity signal is applied to flip flop 11 during the entire operation of the apparatus. A select input 29,45 or a replace input 35,41 is applied to place the apparatus in either the select or replace mode. The apparatus is initialized for each new vector by signals on the initialize inputs 65 and 71, and the clear input 91 as discussed above and shown in Tables I and II. In addition, the computer provides two input buffers coupled to inputs 81 and 93 and an output buffer coupled to output register 9. An example of a replace operation utilizing the apparatus of this invention is given in Table II where the second vector stream contains the index values 1, 5, 7, 9.

Having described the invention in connection with certain specific embodiments thereof, it is to be understood that certain modifications may suggest themselves to those skilled in the art and is intended to cover such modifications as fall within the scope of the appended claims.

What is claimed is:

1. An apparatus for transferring elements of a first vector stream having selected indices to a third vector stream comprising:

a. first register means for receiving a first data vector stream element by element;

b. second register means for receiving a second vector stream element by element, said second vector stream defining selected indices of said first vector stream;

c. index generating means for generating a sequence of vector indices corresponding to the indices of vector elements of said first vector stream as such vector elements are received in said first register means;

d. comparator means coupled to said second register means and to said index generating means for comparing said selected indices with said generated indices;

e. output register means for storing vector elements of said first vector stream; and f. gating means responsive to said comparison means, coupling said first input register means to said output register means, wherein vector elements of said first vector stream are transferred from said first register means to said output register means only if the index of such vector elements correspond to the selected indices defined by said second vector stream.

2. The apparatus according to claim 1 including control means coupling said comparator means to said second register means for controlling said second register to receive a new element of said second vector stream each time the selected indices defined by said second vector stream correspond to the generated indices.

3. The apparatus according to claim 1 including control means coupled to said first register means for controlling said first register to receive new elements of said first vector stream each time a new index is generated by said index generating means.

4. The apparatus according to claim 1 including means coupled to said comparator means for comparing said selected indices of said second vector stream with a boolean constant.

5. The apparatus of claim 1 including control means coupled to said comparator means for controlling the transfer of elements from said output register means to a third vector stream in accordance with the result of the comparison made by said comparator means.

6. An apparatus for transferring elements of a first vector stream to replace selected elements of a third vector stream comprising:

a. first register means for receiving a first vector stream element by element;

b. second register means for receiving a second vector stream element by element, said second vector stream defining selected indices of a third vector stream which are to be replaced by elements of said first vector stream;

c. index generating means for generating a sequence of vector indices corresponding to the indices of the vector elements of said third vector stream;

d. comparator means coupled to said second register means and to said index generating means for comparing said selected indices with said generated indices;

e. output register means for storing vector elements of said first vector stream; and f. gating means responsive to said comparator means, coupling said first input register means to said output register means, wherein vector elements of said first vector stream are transferred from said first register means to said output register means only if the indices of said third vector stream defined by said generated indices correspond to the selected indices defined by said second vector stream.

7. The apparatus according to claim 6 including control means coupling said comparator means to said second register means for controlling said second register means to receive a new element of said second vector stream each time the selected indices defined by said second vector stream correspond to the generated indices.

8. The apparatus according to claim 7 including control means coupling said first register means to said second register means for controlling said first register means to receive a new element of said first vector stream each time the selected indices defined by said second vector stream correspond to the generated indices.

9. The apparatus according to claim 8 including means coupled to said comparator means for comparing said selected indices of said third vector stream with a boolean constant.

10. The apparatus of claim 1 including control means coupled to said comparator means for controlling the transfer of elements from said output register means to replace the selected elements of said third vector stream in accordance with the result of the comparison made by said comparator means.

11. An apparatus for transferring elements of a first vector stream having selected indices to a third vector stream in a select mode and for transferring elements of a first vector stream to replace selected elements of a third vector stream in a replace mode comprising:

a. first register means for receiving a first vector stream element by element;

b. second register means for receiving a second vector stream element by element, said second vector stream defining the selected indices;

c. index generating means for generating a continuous sequence of vector indices;

d. comparator means coupled to said second register means and to said index generating means for comparing said selected indices with said generated indices;

e. output register means for storing vector elements of said first vector stream;

f. gating means responsive to said comparator means, coupling said first input register means to said output register means wherein vector elements of said first vector stream are transferred from said first register means to said output register means only if the indices generated by said index generating means corresponds to the selected indices defined by said second vector stream; and g. control means responsive to select and replace signals for controlling the receiving of vector elements by the first and second registers in accordance with the respective mode.

12. The apparatus according to claim 11 wherein the generated indices correspond to the indices of vector elements of said first vector stream as such vector elements are received in said first register means in said select mode and correspond to the indices of the vector elements of said third vector stream in the replace mode wherein vector elements of said first vector stream are transferred from said first register means to said output register means only if the index of such vector elements correspond to the selected indices defined by said second vector stream in the select mode and wherein vector elements of said first vector stream are transferred from said first register means to said output register means only if the indices of said third vector stream defined by said generated indices correspond to the selected indices of said third vector stream defined by said second vector stream in the replace mode.

13. The apparatus according to claim 11 wherein said control means includes means coupling said comparator means to said second register means for controlling said second register to receive a new element of said second vector stream each time the selected indices defined by said second vector stream correspond to the generated indices.

14. The apparatus according to claim 11 wherein said control means includes means coupled to said first register means for controlling said first register to receive new elements of said first vector stream each time a new index is generated by said index generating means in the select mode.

15. The apparatus according to claim 11 wherein said control means includes means coupling said first register means to said second register means for controlling said first register means to receive a new element of said first vector stream each time the selected indices defined by said second vector stream correspond to the generated indices in the replace mode.

16. The apparatus according to claim 11 wherein said control means includes means coupled to said comparator means for controlling the transfer of elements from said output register means to a third vector stream in accordance with the result of the comparison made by said comparator means.

17. The apparatus according to claim 16 wherein said control means includes means coupled to said comparator means for controlling the generation of the index of the elements of the third vector stream.

18. The apparatus according to claim 11 wherein said control means includes means coupled to said comparator means for comparing said selected indices of said second vector stream with a boolean constant.

* * * * *

UNITED STATES PATENT OFFICE
CERTIFICATE OF CORRECTION

Patent No. 3,827,031 Dated July 13, 1974

Inventor(s) William D. Kastner and Gary W. Cobb

It is certified that error appears in the above-identified patent and that said Letters Patent are hereby corrected as shown below:

Change the assignee from "Instruments Incorporated" to --Texas Instruments Incorporated--.

Signed and sealed this 5th day of November 1974.

(SEAL)
Attest:

McCOY M. GIBSON JR.
Attesting Officer

C. MARSHALL DANN
Commissioner of Patents